G. A. PURSLY.
Grain-Drills.

No. 139,610.

Patented June 3, 1873.

Witnesses:
E. Wolff.
S. Sedgwick

Inventor:
G. A. Pursly
Per
Mmm
Attorneys.

UNITED STATES PATENT OFFICE.

GEORGE A. PURSLY, OF PITTSFIELD, ILLINOIS.

IMPROVEMENT IN GRAIN-DRILLS.

Specification forming part of Letters Patent No. 139,610, dated June 3, 1873; application filed March 8, 1873.

*To all whom it may concern:*

Figure 1:
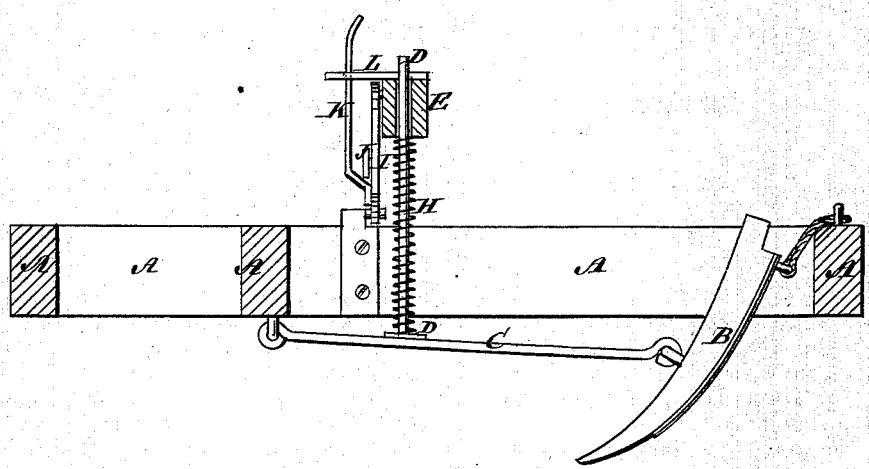
Figure 2:
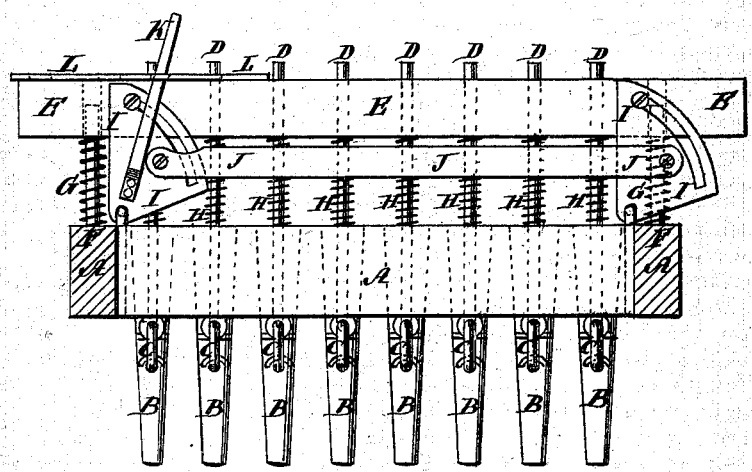

Be it known that I, GEORGE A. PURSLY, of Pittsfield, in the county of Pike and State of Illinois, have invented a new and useful Improvement in Grain-Drill, of which the following is a specification:

Figure 1 is a detail vertical longitudinal section of my improved grain-drill. Fig. 2 is a detail vertical cross-section of the same.

Similar letters of reference indicate corresponding parts.

My invention relates to a combination of springs and adjusting devices for graduating the force with which the flukes or seed-tubes are pressed into the earth. The invention consists in the combination of the movable bar and its guide-rods and springs with the frame, draft-rods, and flukes; and in the combination of the pivoted and slotted plates, the pivoted connecting-bar, and the lever, with the movable bar, the guide-rods and springs, the draft-rods, the flukes, and the frame, as hereinafter fully described.

A represents the frame of the machine. B are the flukes, which are suspended from the rear part of the frame A, and the draft-strain upon which is sustained by the rods C, the forward ends of which are pivoted to a cross-bar A. With each of the draft-rods C is connected the lower end of a guide-rod, D, which passes up through a hole in a beam or bar, E, which moves up and down upon guide-rods F attached to the side bars of the frame A, and which pass through holes in the ends of the said bar E. The bar is held up by springs G coiled around the rods F. H are springs coiled around the rods D, the upper ends of which bear against the lower side of the bar E, and their lower ends bear against the draft-rods C.

By this arrangement the downward movement of the bar E compresses the springs H, and causes them to press upon the draft-rods C, and thus hold the flukes B down to their work with a yielding pressure, so that the said flukes may be held down with a greater or less pressure by moving the bar E down or up.

I are triangular plates, which are pivoted, at their angles, to the side bars of the frame A, or to supports attached to said side bars. In the plates I are formed curved eccentric or cam slots to receive pins attached to the bar E, so that the said bar E may be drawn down by moving the said plates I upon their pivots.

The plates I are connected and caused to move together by a bar, J, the ends of which are pivoted to the said plates. To one of the plates I is rigidly attached a lever, K, which passes up along the side of the bar E, and through a slot in a plate, L, attached to the upper side of the said bar E. In the plate L, at the side of the slot, is formed a number of notches to receive the lever K to lock the bar E in any position into which it may be adjusted.

Having thus described my invention, I claim as new and desire to secure by Letters Patent—

The combination of the pivoted and slotted plates I, pivoted connecting-bar J, and lever K, with the bar E, guide-rods D and F, springs H and G, draft-rods C, flukes B, and frames A, substantially as herein shown and described.

GEORGE A. PURSLY.

Witnesses:

JOHN RAY,
THOMAS GRAY.